United States Patent [19]

Auinger

[11] Patent Number: 4,751,448
[45] Date of Patent: Jun. 14, 1988

[54] ARMATURE WINDING FOR A STATIC CONVERTER-FED ELECTRICAL INDUCTION MACHINE

[75] Inventor: Herbert Auinger, Nuremberg, Fed. Rep. of Germany

[73] Assignee: Siemens Aktiengesellschaft, Berlin and Munich, Fed. Rep. of Germany

[21] Appl. No.: 23,422

[22] Filed: Mar. 9, 1987

Related U.S. Application Data

[63] Continuation of Ser. No. 681,928, Dec. 14, 1984.

[30] Foreign Application Priority Data

Dec. 14, 1983 [DE] Fed. Rep. of Germany ....... 3345272

[51] Int. Cl.$^4$ ............................................. H02P 1/38
[52] U.S. Cl. .................................... 318/773; 318/722; 318/801
[58] Field of Search ................. 318/773, 801, 495, 80, 318/94; 310/79, 195, 267, 234, 132, 140, 264, 273, 198

[56] References Cited

U.S. PATENT DOCUMENTS

| | | | |
|---|---|---|---|
| 4,127,787 | 11/1978 | Auinger | 310/198 |
| 4,138,619 | 2/1979 | Broadway et al. | 318/773 |
| 4,161,680 | 7/1979 | Akamatsu | 318/801 |
| 4,163,915 | 8/1979 | Fong | 310/198 |
| 4,260,923 | 5/1981 | Rawcliffe | 318/773 |
| 4,532,449 | 7/1985 | Aoki | 310/234 |

*Primary Examiner*—William M. Shoop, Jr.
*Assistant Examiner*—Brian Young
*Attorney, Agent, or Firm*—Volker R. Ulbrich; Lawrence C. Edelman

[57] ABSTRACT

An armature winding is provided for an induction machine with an odd phase number $m \geq 5$ which has m connection points for its winding sections to a converter. Connections to the converter are made that first and second $(m-1)/2$ phase windings have current flow in opposite directions and the remaining phase winding advances outwards in electrical angle steps of $(\pi/m)$. A higher pulse number and thus good concentricity characteristics with high machine efficiency can be attained with star or polygonal circuits of the phase windings, and an improved optimal adjustment of the load-bearing capacity of the most varying electronic components can be attained by the polygonal circuitry having multiple rings of the phase windings.

8 Claims, 5 Drawing Sheets

ARMATURE WINDING FOR A STATIC CONVERTER-FED ELECTRICAL INDUCTION MACHINE

This is a continuation of application Ser. No. 681,928 filed Dec. 14, 1984.

BACKGROUND OF THE INVENTION

This invention relates to an armature winding for a static, converter-fed electrical induction machine.

Static converter-fed electrical induction machines are customarily designed in the same manner as machines for operation with line current using a star or delta circuit, $m=3$ phase winding and operated with a 6-pulse converter circuit (usually a three-phase bridge). With high capacities and/or current levels it is normal to subdivide the winding into two three-phase systems offset electrically by 30 degrees, thereby resulting in a 12-pulse operation.

Phase numbers deviating from $m=3$ are seldom employed. A 4-pulse circuit operated with $m=2$ or $m=4$ phase windings are employed, for example, only in small-size electronic motors.

The periodical "Elektrische Energie-Technik" Volume 25, No. 6, 1980, pages 277-281, describes an intermediate circuit static frequency converter with a 5-phase winding asynchronous motor in which the 5 phase windings of the armature winding are connected in a polygonal circuit (ring circuit). In these armature windings, as is the case with normal 3-branch polygonal or star circuits, the individual phase windings are current-bearing sequentially at electrical angle spacings offset respectively by $2/m$ in time, resulting in a 1 m or 2 m pulse operation.

The possibility of adjusting the armature winding to the current and voltage loads of the controllable semiconductor components of an "electronic commutator" for cyclical feed of the phase windings, e.g., with d.c. current, which exists only to a limited extent in accordance with the fundamental principles, is provided by a modification of the coil wire cross-section and/or, if necessary, by a distribution of the individual phase windings into parallel circuits. Particularly for the increasingly powerful modern electronic components, such as disconnectable thyristors (GTOs), field effect transitors (FETs), bipolar power transistors and similar items, the optimum use of these components can often not be attained by these measures. Accordingly, it will be appreciated that it would be highly desirable to provide an armature winding which makes optimum use of powerful modern electronic components.

It is an object of the present invention to provide an armature winding for an electrical machine.

It is also an object of the present invention to provide an armature winding with a high pulse number.

Another object of the invention is to provide an armature winding for developing a high level of equipment efficiency and good concentricity.

SUMMARY OF THE INVENTION

Briefly stated, in accordance with one aspect of the invention, the foregoing objects are achieved by providing an armature winding whereby a high level of equipment efficiency and good concentricity characteristics are attained. Both characteristics are attained in polygonal as well as in star circuits. In accordance with the invention, a commutator makes d.c. connections to individual ones of the m phase windings so that $(m-1)/2$ of the windings have current flow in a first direction, a different $(m-1)/2$ of the windings have current flow in a second direction opposite to the first direction, and a remaining one of the windings has no current flow. High equipment efficiency is assured by the lowest possible number of commutating components and good concentricity characteristics are attained by the smallest possible spatial angle jumps when transferring the armature magnetic flux given an uneven number of phase windings m, ($m \geq 5$). The m-phase armature winding is often connected by controllable electronic components (electronic commutator) to a d.c. current source of variable voltage.

The changeable d.c. voltage in reference to a variable rpm can be generated from a power source with constant d.c. voltage, because the semiconductor elements feeding the armature winding are controlled at an adequately high clock frequency (chopper operation), so that on a time average a continuously variable voltage is in effect. The electronic commutator can also be a branch of a direct a.c. converter establishing a cyclically controlled connection of the armature winding with an a.c. voltage source. The mode of operation of the induction machine can either be by a motor or by a generator.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiment taken in conjunction with the accompanying drawings in which models for m ($m \geq 5$) uneven phase windings of armature windings and their potential distributions for a respective momentary circuit status are depicted and wherein:

FIGS. 2 through 25 illustrate normal (single ring) polygonal, star and multiple ring polygonal circuits for various values of m, wherein the FIG. 1 commutator makes d.c. connection to individual ones of the phase windings in accordance with the principles of the invention more specifically in:

FIGS. 2 through 4 for $m=5$;
FIGS. 5 through 8 for $m=7$;
FIGS. 9 through 12 for $m=9$;
FIGS. 13 through 18 for $m=11$; and in
FIGS. 19 through 25 for $m=13$.

DESCRIPTION OF THE PREFERRED EMBODIMENT

Figure 1:
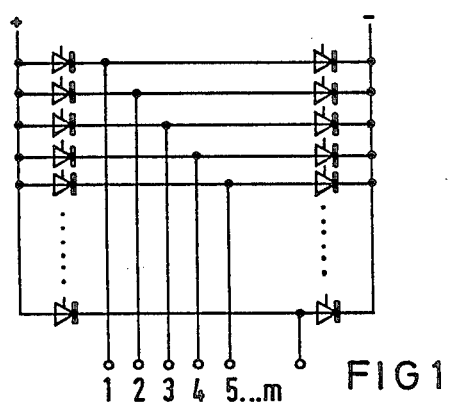
FIG. 1 illustrates an electronic commutator for connecting the armature winding to a d.c. current source in the form of an m-phase bridge circuit with controllable semiconductor components.
Figure 3:
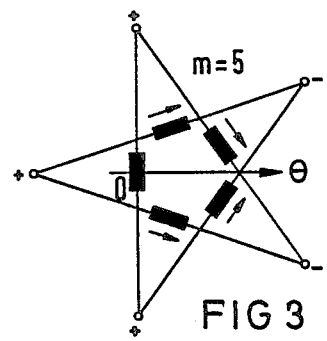
Figure 2:
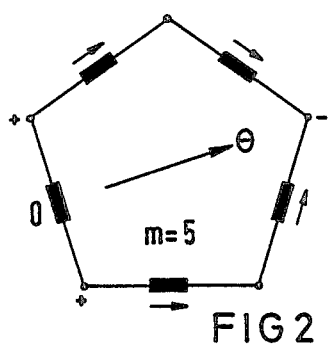
Figure 4:
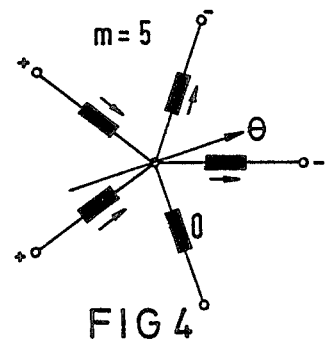
Figure 5:
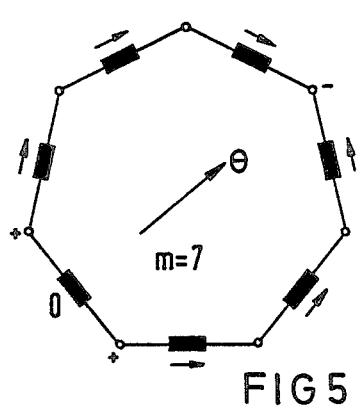

Referring to the drawings, the current-conducting phase windings for any given instant are identified at the properly polarized and current-flow controlled connection points by plus and minus signs and by small arrows showing the current flow direction. The corresponding electronic switches of the converter shown in FIG. 1 are omitted in the remaining figures. In FIGS. 2 through 12 the phase windings are shown as rectangles, while in the remaining figures only the axes are indicated along with one phase winding, due to a lack of space. The large arrows depict the resulting spatial magnetic flux vector ($\theta$) for the instant being considered.

The individual phase windings or their axes are shown in accordance with their electrical phase position which at p=1 is identical to their spatial position. The electrical angle spacing is ($2\pi/m$). Since both positive and negative (i.e., opposite direction) coil magnetic penetrations (phase winding magnetic penetrations) are possible, the electrical step angle given an uneven phase winding number m is only half of the electrical angle spacing, i.e., ($\pi/m$), for transferring the resulting total magnetic flux ($\theta$) (large arrow). Therefore a correspondingly high-pulse operation (pulse rate 2 m) with good concentric characteristics results.

FIGS. 2, 5, 9, 13 and 19 involve normal polygonal circuits; FIGS. 4, 8, 12, 18 and 25 involve normal star circuits, and the remaining FIGS. 3, 6, 7, 10, 11, 14, 15, 16, 17, and 20 through 24 involve multiple-phase winding polygonal circuits.

The cyclically stepped connection of the d.c. source terminals in accordance with the invention is arranged in polygonal circuits so that at any given moment two spatially adjacent connection points are connected to the plus or minus terminal, and the connection points facing these points are connected to the minus or plus terminal, thereby always having two parallel current circuits, each with ½ (m−1) sequentially current-conducting phase windings, with the remaining phase winding being connected at both ends to plus or minus potential and thereby being disconnected from the supply voltage, i.e., deactivated. In the next circuit status (i.e., step of the cycle) the one plus potential is disconnected and the facing minus potential added so that the resulting spatial magnetic flux vector ($\theta$) shifts (steps) by an angle ($\pi/m$) respectively. This process repeats cyclically.

For star circuits, the same number of connections of positive and negative always exist, and the remaining connection is deenergized. The current flow proceeds as described above.

In the multiple-ring polygonal circuits, the winding circuit does not close (i.e., the d.c. connection of the beginning of the first phase winding to the end of the last phase winding) until after a minimum of two rotations around the armature, so that in contrast to a normal polygonal circuit the number of parallel current-bearing circuits is multiplied, while simultaneously increasing the number of current-bearing connection points, with again only one branch (identified by zero) being inactive.

The table summarizes the circuit and connection parameters shown in FIGS. 2 through 25. The left hand of the table gives an overwiew regarding the respective current-bearing feed terminals of the individual circuits and the resulting parallel current-bearing circuits. Given an unchanged electromagnetic effect, one can thus adapt to the permissible current and voltage loads of the available electronic components when rating the winding. If, for example, U designates the voltage and I the current of a phase winding and T the period, then for the individual circuit variants the thyristor loads summarized in the right-hand portion of the table are produced.

Aside from the preferred circuits which have a completely symmetrical distribution, one can also have parallel branches with a varying number of windings in the individual variants as shown marked by an "X" in the following table.

| m | Figure | Current-Conducting Connection Points | Parallel Branches × Coils Per Branch | | Voltage Between Plus and Minus | Thyristor Current | Thyristor Conduction Period |
|---|---|---|---|---|---|---|---|
| 5 | 2 | 2 + 1 = 3 | 2 × 2 | | 2 U | 2 I | 1/5 T |
|   | 3 | 3 + 2 = 5 | 4 × 1 | | U | 2 I | 2/5 T |
|   | 4 | 2 + 2 = 4 | 4 × 1 | | 2 U | I | 2/5 T |
| 7 | 5 | 2 + 1 = 3 | 2 × 3 | | 3 U | 2 I | 1/7 T |
|   | 6 | 3 + 2 = 5 | 2 × 2<br>2 × 1 | (x) | 2 U | 2 I | 2/7 T |
|   | 7 | 4 + 3 = 7 | 6 × 1 | | U | 2 I | 3/7 T |
|   | 8 | 3 + 3 = 6 | 6 × 1 | | 2 U | I | 3/7 T |
| 9 | 9 | 2 + 1 = 3 | 2 × 4 | | 4 U | 2 I | 1/9 T |
|   | 10 | 3 + 2 = 5 | 4 × 2 | | 2 U | 2 I | 2/9 T |
|   | 11 | 5 + 4 = 9 | 2 × 4 | | U | 2 I | 4/9 T |
|   | 12 | 4 + 4 = 8 | 2 × 4 | | 2 U | I | 4/9 T |
| 11 | 13 | 2 + 1 = 3 | 2 × 5 | | 5 U | 2 I | 1/11 T |
|   | 14 | 3 + 2 = 5 | 2 × 3<br>2 × 2 | (x) | 3 U | 2 I | 2/11 T |
|   | 15 | 4 + 3 = 7 | 4 × 2<br>2 × 1 | (x) | 2 U | 2 I | 3/11 T |
|   | 16 | 5 + 4 = 9 | 6 × 1<br>2 × 2 | (x) | 2 U | 2 I | 4/11 T |
|   | 17 | 6 + 5 = 11 | 10 × 1 | | U | 2 I | 5/11 T |
|   | 18 | 5 + 5 = 10 | 10 × 1 | | 2 U | I | 5/11 T |
| 13 | 19 | 2 + 1 = 3 | 2 × 6 | | 6 U | 2 I | 1/13 T |
|   | 20 | 3 + 2 = 5 | 4 × 3 | | 3 U | 2 I | 2/13 T |
|   | 21 | 4 + 3 = 7 | 6 × 2 | | 2 U | 2 I | 3/13 T |
|   | 22 | 5 + 4 = 9 | 4 × 2<br>4 × 1 | (x) | 2 U | 2 I | 4/13 T |
|   | 23 | 6 + 5 = 11 | 8 × 1<br>2 × 2 | (x) | 2 U | 2 I | 5/13 T |
|   | 24 | 7 + 6 = 13 | 12 × 1 | | U | 2 I | 6/13 T |

| m | Figure | Current-Conducting Connection Points | Parallel Branches × Coils Per Branch | Voltage Between Plus and Minus | Thyristor Current | Thyristor Conduction Period |
|---|---|---|---|---|---|---|
|  | 25 | 6 + 6 = 12 | 12 × 1 | 2 U | I | 6/13 T |

(x) nonsymmetrical distribution of coils in the parallel branches

Figure 6:
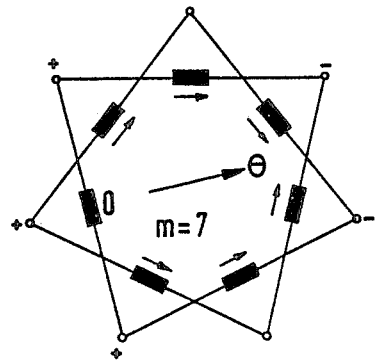
Figure 7:
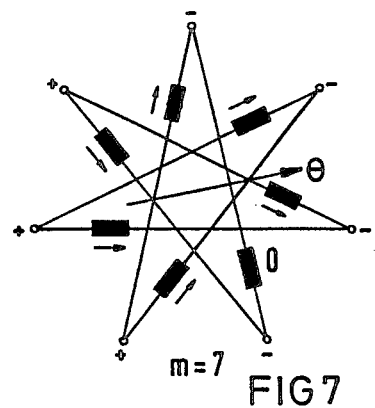
Figure 8:
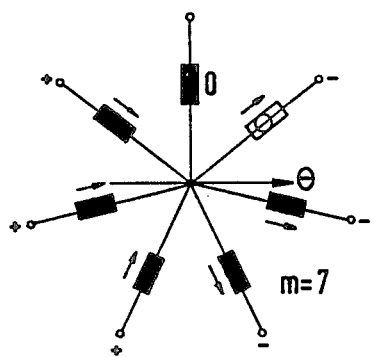
Figure 9:
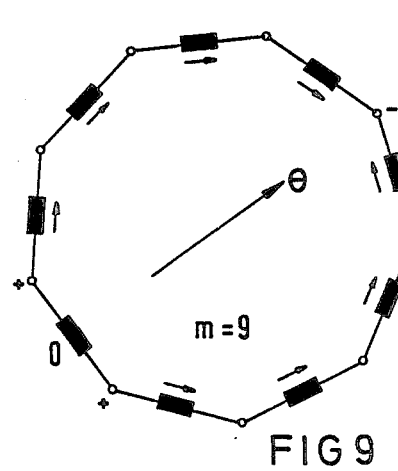
Figure 10:
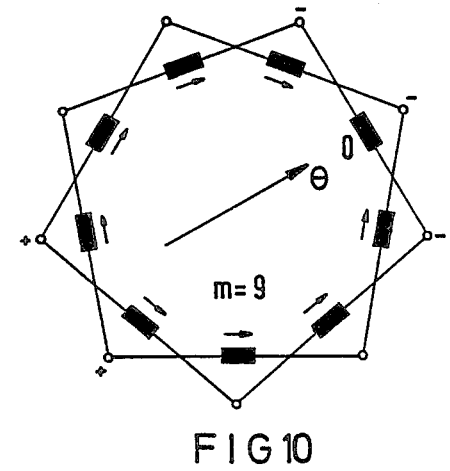
Figure 11:
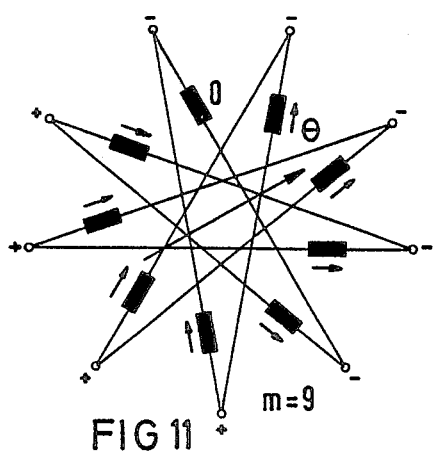
Figure 12:
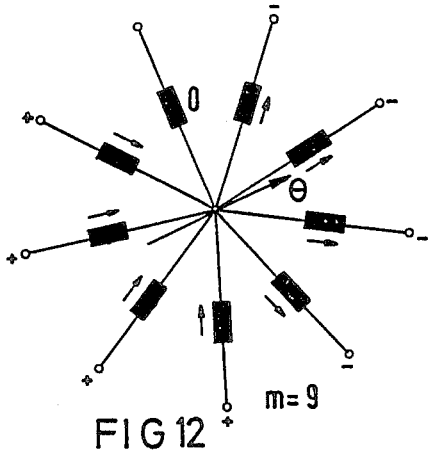
Figure 13:
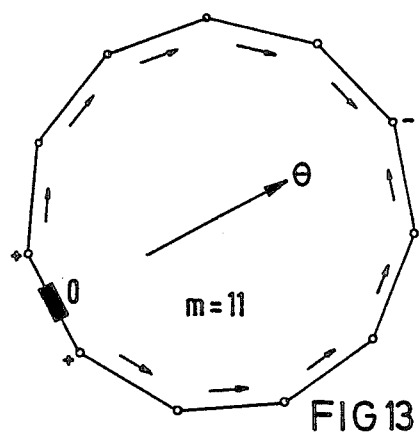
Figure 14:
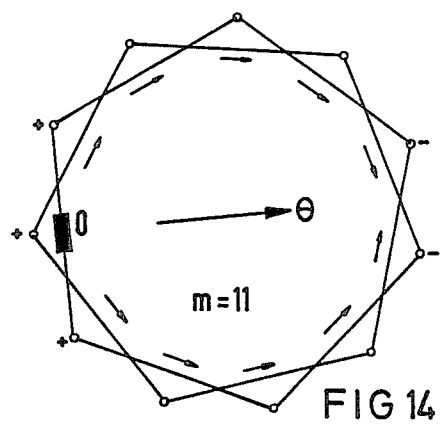
Figure 15:
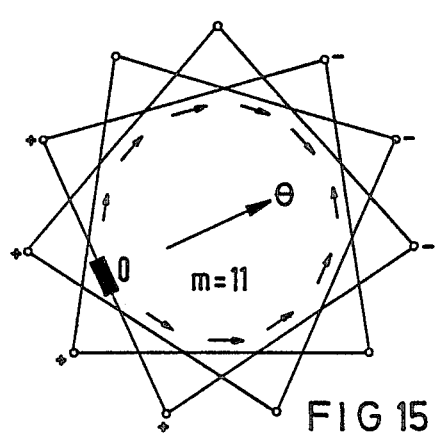
Figure 16:
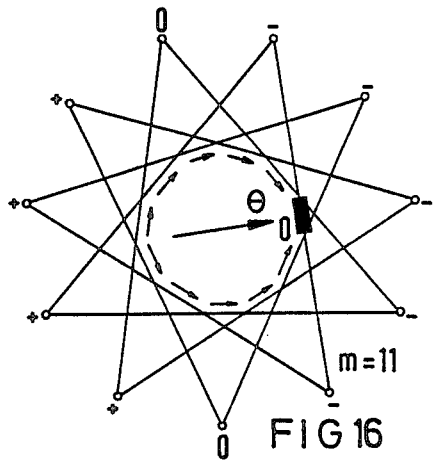
Figure 17:
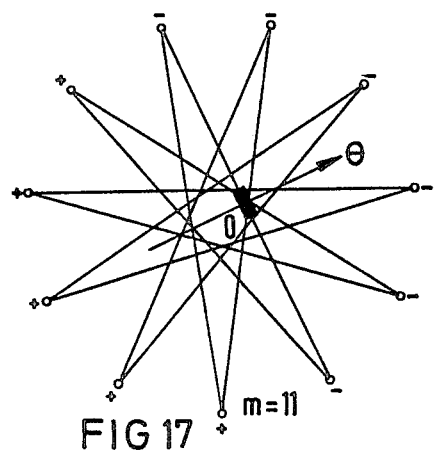
Figure 18:
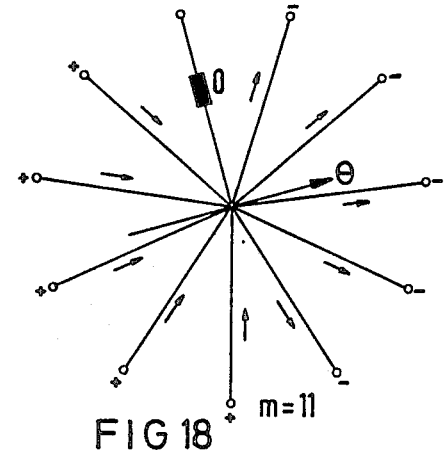
Figure 19:
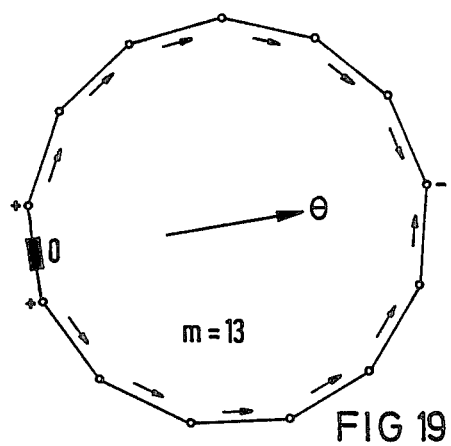
Figure 20:
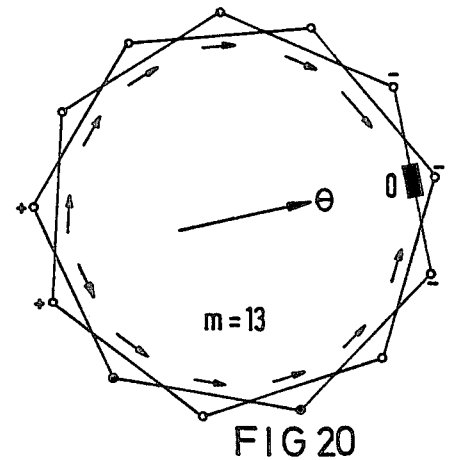
Figure 21:
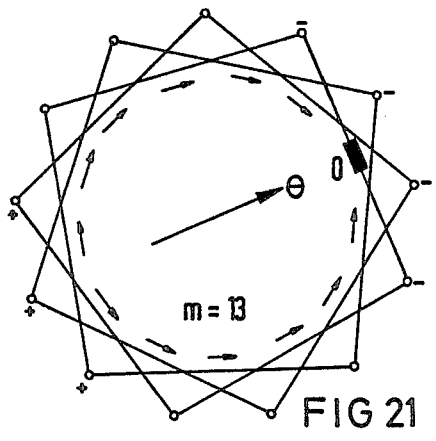
Figure 22:
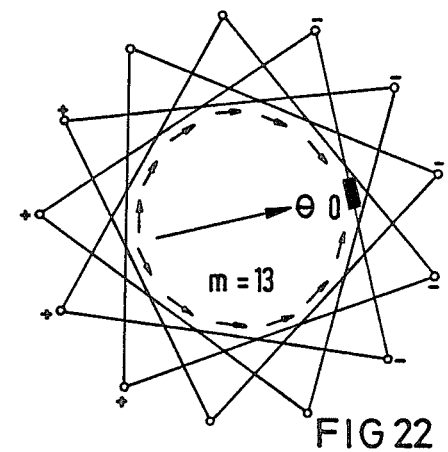
Figure 23:
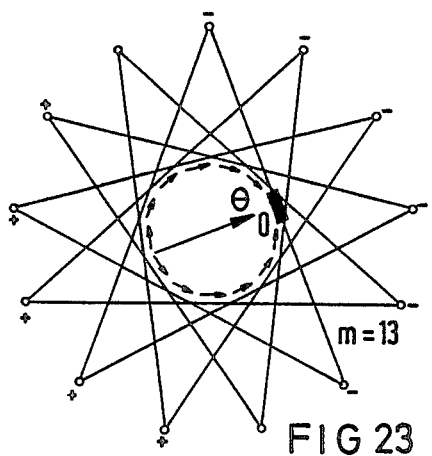
Figure 24:
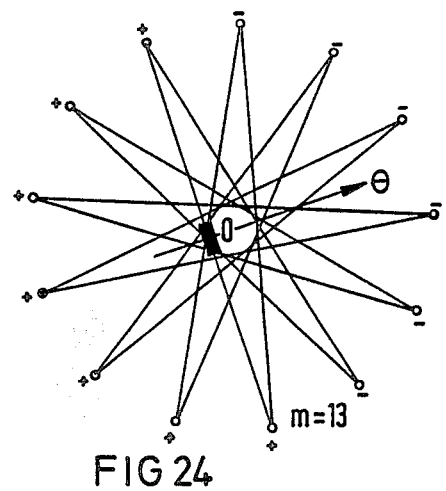
Figure 25:
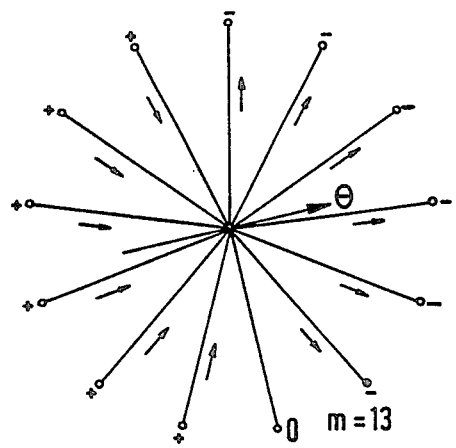

Thus the circuit in FIG. 6 contains two branches with two series-connected phase windings offset from each other by ($3\pi/7$) and two branches each with only one phase winding. Such a circuit is well suited for equipment with a sinusoidal-like air-gap field pattern, while it is not advantageous for equipment with rectangularly shaped air-gap field patterns due to the inadequately high balancing currents.

For high-power units generally several parallel winding arrangements are designed which are galvanically separated on the connected side to assure even current load on the controllable circuit components. In that case the basic circuits shown in FIGS. 3, 6, 7, 10, 11, 14 through 17 and 20 through 24 can be arranged in a congruent or mirror-symmetrical or polar-symmetrical position so that, for example, in the latter case 2 m winding systems (winding phases) are produced.

A completely even cyclical spatial magnetic flux distribution arises for m slots for each pole if each slot is connected to another phase winding. If necessary, given larger units, q slots can be designed per pole and phase winding with the slot number N=2p.q.m (p=pole pair number), while accepting a somewhat lower efficiency due to the zone and pitch factor.

The coil step width is designed most effectively without or with only a very slight pitch with W=$\pi_p$. A pitch arrangement makes sense only at q=2 in conjunction with a step shortening W−$\pi_p$=(q/2) ($\pi_N$) with coil width W, pole pitch $\pi_p$, slot pitch $\pi_N$, with the winding being designed as a one- or two-layered wire-wound coil or as a wave- or loop-shaped bar winding. To reduce the number of slots N, fractional slot windings with fractional slot numbers q′=z/n whose denominator n=2p/t is a whole-number, dividend t of the pole number 2p, i.e., q′, can be designed. In that case the coil arrangement does not repeat from pole to pole, but only after n pole pitches, with the slot number N=q.t.m. The smallest possible number of slots is then found at q=t=1 with N min=m. In integral slot windings with slot numbers N=2p.q.m there are always t=2p phase-matching coils per phase winding, while for fractional slot windings there are only t=2p/n. In the extreme instance with the minimal slot number Nmin=m there is thus only one coil per phase winding, and the armature winding consists of m individual pole coils similar to the arrangement in salient-pole exciter windings.

It will now be understood that there has been disclosed an armature winding for a static converter-fed electrical machine which makes optimum use of modern electronic components. The armature winding has a high pulse number and develops a high level of equipment efficiency and good concentricity.

As will be evident from the foregoing description, certain aspects of the invention are not limited to the particular details of the examples illustrated, and it is therefore contemplated that other modifications or applications will occur to those skilled in the art. It is accordingly intended that the claims shall cover all such modifications and applications as do not depart from the true spirit and script of the invention.

What is claimed as new and desired to be secured by letters patent of the United States is:

1. A static converter-fed electric rotating field machine, comprising:
    an armature having an odd numbered plurality of phase winding sections m=5, 7, ... etc., said phase winding sections being spatially distributed evenly about the circumference of said machine and each having at least one end d.c. coupled to another one of said phase winding sections;
    a d.c. energy source;
    controllable circuit elements for electronically connecting selected ones of said phase winding sections to said energy source in a cyclical stepwise manner, thereby causing said plurality of phase winding sections to generate an overall magnetic flux vector which spatially advances stepwise in the armature at stepped electrical angles of $\pi/m$ in response to said stepwise electrical interconnections; and
    at any given interconnection step during said cyclical stepwise interconnections, said controllable circuit elements are connected to said selected ones of said phase winding sections so that (m−1)/2 of said plurality of phase winding sections are traversed by current flowing in a first direction, a different (m−1)/2 of said plurality of phase winding sections are traversed by current flowing in a second direction which is opposite to said first direction and a remaining one of said phase winding sections is not traversed with a current flow, and at an interconnection step which next follows said given step in said cyclical stepwise interconnections, a different one of said plurality of phase winding sections is selected for said remaining one of the phase winding sections.

2. A rotating field machine according to claim 1, wherein;
    said plurality of phase winding sections are d.c. connected together to form a star circuit.

3. A rotating field machine according to claim 1, wherein:
    said plurality of phase winding sections are d.c. connected together to form an m-sided polygonal circuit.

4. A rotating field machine according to claim 3, wherein:
    said m-sided polygonal circuit comprises a series d.c. connected of said phase winding sections in a helix configuration which circumscribes said machine n times, n being greater than 1.

5. A rotating field machine according to claim 3, wherein:
    said m-sided polygonal circuit comprises n electrically isolated rings of series d.c. connected phase winding sections, each of said rings being spatially offset with respect to each other so as to evenly distribute all of said phase winding sections about the circumference of said machine, n being greater than 1.

6. A rotating field machine according to claim 1, wherein:
   said d.c. energy source comprises a variable d.c. voltage source.

7. A rotating field machine according to claim 1, wherein:
   said d.c. energy source comprises a constant d.c. voltage source and said controllable circuit elements are controllable to turn on and off at a controllable clock rate which is sufficiently high so as to be able to apply to said selected ones of said phase winding sections a variable voltage.

8. A rotating field machine according to claim 1, wherein:
   at said interconnection step which next follows said given step, different groups of said plurality of phase winding sections are selected for said first and said second mentioned $(m-1)/2$ phase winding sections.

* * * * *